United States Patent [19]

Patsch

[11] Patent Number: 6,159,250
[45] Date of Patent: Dec. 12, 2000

[54] DOUBLED REACTIVE DYES

[75] Inventor: Manfred Patsch, Wachenheim, Germany

[73] Assignee: BASF Aktiengesellschaft, Ludwigshafen, Germany

[21] Appl. No.: 09/446,102

[22] PCT Filed: Oct. 16, 1998

[86] PCT No.: PCT/EP98/06576

§ 371 Date: Dec. 22, 1999

§ 102(e) Date: Dec. 22, 1999

[87] PCT Pub. No.: WO99/23169

PCT Pub. Date: May 14, 1999

[30] Foreign Application Priority Data

Oct. 30, 1997 [DE] Germany ............................ 197 47 866

[51] Int. Cl.[7] .......................... C09B 62/04; C09B 67/221; D06P 1/382

[52] U.S. Cl. ........................... 8/549; 8/638; 8/639; 8/641; 8/643; 8/685; 8/918; 8/924; 534/634; 534/637; 534/638; 540/126; 544/76; 544/77; 552/218; 552/219

[58] Field of Search ................................ 8/639–643, 549, 8/685, 918, 924; 534/634, 637, 638; 540/126; 544/76, 77; 552/218, 219

[56] References Cited

U.S. PATENT DOCUMENTS 5,968,208   10/1999   Taylor .

FOREIGN PATENT DOCUMENTS 2425283   5/1997   Germany .
91/19137  5/1997   Germany .

Primary Examiner—Margaret Einsmann
Attorney, Agent, or Firm—Oblon, Spivak, McClelland, Maier & Neustadt, P.C.

[57] ABSTRACT

Doubled reactive dyes of the general formula I

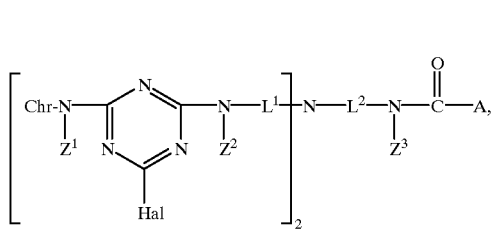

where

Chr is a chromophore residue with or without further fiber-reactive groups and derived from a metallized or unmetallized mono- or disazo dye, from a triphendioxazine, from an anthraquinone, from a metallized formazan or from a metallized phthalocyanine, $Z^1$, $Z^2$ and $Z^3$ are each independently of the others hydrogen or substituted or unsubstituted $C_1$–$C_6$-alkyl, Hal is fluorine or chlorine $L^1$ and $L^2$ are each independently of the other $C_2$–$C_6$-alkylene with or without interruption by 1 or 2 unadjacent oxygen atoms, and A is hydrogen, substituted or unsubstituted $C_1$–$C_6$-alkyl, substituted or unsubstituted phenyl, substituted or unsubstituted $C_2$–$C_3$-alkenyl, substituted or unsubstituted $C_1$–$C_6$-alkoxy, substituted or unsubstituted phenoxy or $C_1$–$C_6$-alkylamino, and their mixtures are prepared and useful for dyeing or printing hydroxyl-containing or nitrogenous substances.

11 Claims, No Drawings

DOUBLED REACTIVE DYES

SPECIFICATION

The present invention relates to novel reactive dyes of the formula I

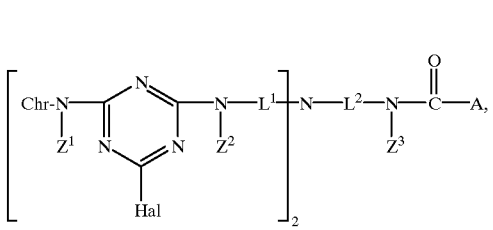

(I)

where

Chr is a chromophore residue with or without further fiber-reactive groups and derived from a metallized or unmetallized mono- or disazo dye, from a triphendioxazine, from an anthraquinone, from a metallized formazan or from a metallized phthalocyanine, $Z^1$, $Z^2$ and $Z^3$ are each independently of the others hydrogen or substituted or unsubstituted $C_1$–$C_6$-alkyl, Hal is fluorine or chlorine $L^1$ and $L^2$ are each independently of the other $C_2$–$C_6$-alkylene with or without interruption by 1 or 2 unadjacent oxygen atoms, and A is hydrogen, substituted or unsubstituted $C_1$–$C_6$-alkyl, substituted or unsubstituted phenyl, substituted or unsubstituted $C_2$–$C_3$-alkenyl, substituted or unsubstituted $C_1$–$C_6$-alkoxy, substituted or unsubstituted phenoxy or $C_1$–$C_6$-alkylamino, to their mixtures, to a process for preparing the mixtures and to their use for dyeing or printing hydroxyl-containing or nitrogenous substrates.

WO 97/19137 teaches reactive dyes composed of three chromophores linked via a polyamine. The synthesis of these reactive dyes generally produces not only the trimer but also, owing to incomplete conversion, the sparingly soluble dimer. However, good solubility is an important requirement for reactive dyes, since incomplete solution gives rise to nonuniform dyeings.

It is an object of the present invention to provide novel reactive dyes having advantageous application properties, especially good solubility. Furthermore, they shall be high yielding, have high wetfastnesses and provide brilliant dyeings, and their unfixed portions shall be easy to wash off. In particular, their mixtures with the trimer shall have advantageous properties.

We have found that this object is achieved by the reactive dyes of the formula I defined at the beginning and also by their mixtures, a process for preparing the mixtures and their use for dyeing or printing hydroxyl-containing or nitrogenous substrates.

The novel reactive dyes of the formula I are each shown in the form of their free acids. It will be readily understood that the invention also encompasses their salts.

Suitable cations are derived from metal or ammonium ions. Metal ions are especially lithium, sodium or potassium ions. Ammonium ions for the purposes of the present invention are substituted or unsubstituted ammonium cations. Examples of substituted ammonium cations are monoalkyl-, dialkyl-, trialkyl-, tetraalkyl- or benzyltrialkyl-ammonium cations or those cations derived from nitrogenous five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl is generally straight-chain or branched $C_1$–$C_{20}$-alkyl, which may be substituted by 1 or 2 hydroxyl groups and/or interrupted by from 1 to 4 oxygen atoms in ether function.

In general, all alkyl, alkenyl and alkylene groups mentioned above and appearing in the formulae which follow may be straight-chain or branched.

Substituted alkyl radicals preferably contain, unless otherwise stated, 1, 2 or 3 substituents, especially 1 or 2 substituents, in any desired position.

For substituted alkyl or alkoxy appearing herein, suitable substituents include, for example, unless otherwise stated, chlorine, hydroxyl, methoxy, carboxyl and methoxycarbonyl.

Substituted alkenyl groups can be substituted, for example, by carboxyl and methoxycarbonyl.

For substituted phenyl or phenoxy appearing herein, suitable substituents include, for example, unless otherwise stated, $C_1$–$C_4$-alkyl, $C_1$–$C_4$-alkoxy, halogen, nitro, hydroxysulfonyl, carboxyl, sulfamoyl, carbamoyl or mono- or di-$C_1$–$C_4$-alkylsulfamoyl. The number of substituents is generally within the range from 1 to 3, preferably 1 or 2.

Suitable halogen radicals are fluorine, chlorine and bromine.

$Z^1$, $Z^2$, $Z^3$ and A are each for example methyl, ethyl, propyl, isopropyl, butyl, isobutyl, sec-butyl, tert-butyl, pentyl, isopentyl, neopentyl, tert-pentyl, hexyl, 2-methylpentyl, chloromethyl, 2-chloroethyl, 2- or 3-chloropropyl, 2- or 4-chlorobutyl, hydroxymethyl, 2-hydroxyethyl, 2- or 3-hydroxypropyl, 2- or 4-hydroxybutyl, methoxymethyl, 2-methoxyethyl, 2- or 3-methoxypropyl, 2- or 4-methoxybutyl, carboxymethyl, 2-carboxyethyl, 2- or 3-carboxypropyl, 2- or 4-carboxybutyl, methoxycarbonylmethyl, 2-methoxycarbonylethyl, 2- or 3-methoxycarbonylpropyl or 2- or 4-methoxycarbonylbutyl.

A may also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2,6-dichlorophenyl, 2-, 3- or 4-nitrophenyl, 2-, 3- or 4-hydroxysulfonylphenyl, 2-, 3- or 4-carboxyphenyl, 2-, 3- or 4-sulfamoylphenyl, 2-, 3- or 4-carbamoylphenyl, 2-, 3- or 4-monomethylcarbamoylphenyl, 2-, 3- or 4-dimethylcarbamoylphenyl, vinyl, allyl, isopropenyl, 1-propenyl, methoxy, ethoxy, propoxy, isopropoxy, butoxy, isobutoxy, sec-butoxy, pentyloxy, isopentyloxy, neopentyloxy, tert-pentyloxy, hexyloxy, mono- or dimethylamino, mono- or diethylamino, mono- or dipropylamino, mono- or diisopropylamino, mono- or dihexylamino, 2-carboxyvinyl or 2-carboxypropenyl.

$L^1$ and $L^2$ are each for example $(CH_2)_2$, $(CH_2)_3$, $(CH_2)_4$, $CH(CH_3)CH_2$, $CH(CH_3)CH(CH_3)$, $(CH_2)_5$, $(CH_2)_6$, $(CH_2)_2O(CH_2)_2$, $(CH_2)_3O(CH_2)_2$ or $(CH_2)_4O(CH_2)_2$.

Fiber-reactive groups herein include both additively reacting fiber-reactive radicals and substitutively reacting fiber-reactive radicals.

Substitutive reaction of the fiber-reactive group with the hydroxyl groups or nitrogenous groups in the substrates, for example with the hydroxyl groups of cellulose, means that the leaving groups or atoms (e.g., fluorine or chlorine) in the fiber-reactive radical are substitutively replaced by the hydroxyl groups of the cellulose as per the following scheme:

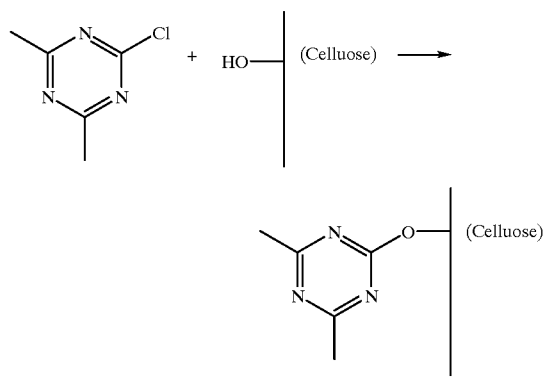

Additively reacting fiber-reactive radicals react for example with the (after elimination to form the vinyl sulfone) hydroxyl groups of cellulose as per the following scheme:

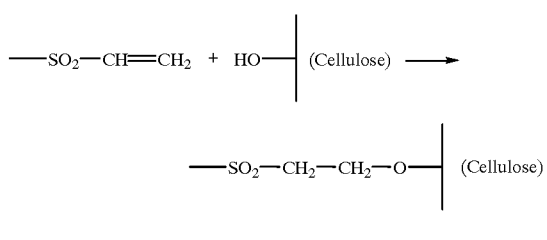

Examples of substitutively reacting fiber-reactive radicals are halogen-substituted radicals derived from 1,3,5-triazine, quinoxaline, phthalazine, pyrimidine, pyridazine or 2-alkylsulfonylbenzothiazole as heterocyclic parent species.

The following heterocyclic radicals are particularly suitable:

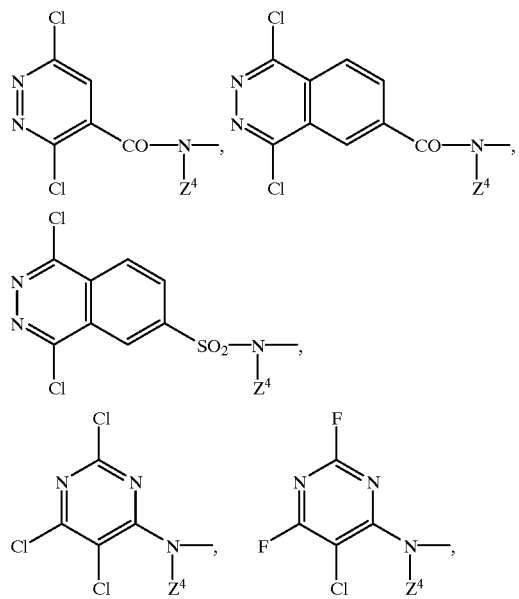

-continued

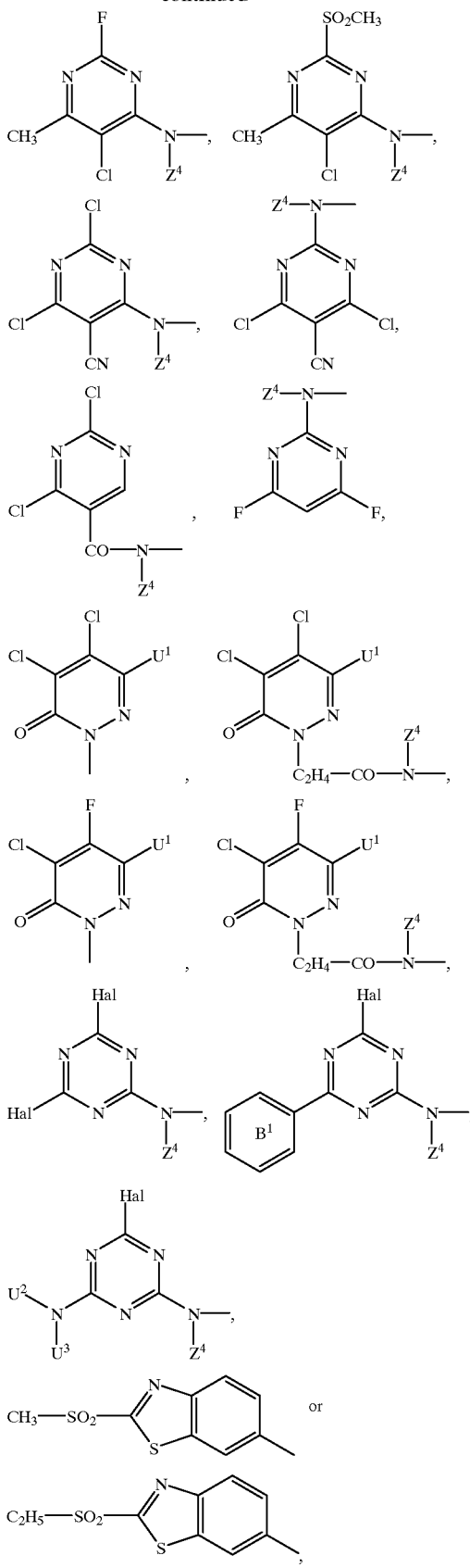

where $Z^4$ is $Z^1$, Hal is in each case as defined above, and $U^1$ is hydrogen or nitro, and $U^2$ and $U^3$ are independently hydrogen or $C_1$–$C_6$-alkyl with or without substitution by hydroxyl, halogen, cyano, hydroxysulfonyl or a radical of the formula —$SO_2$—Y, where Y is vinyl or a radical of the formula $C_2C_4Q$ and Q is an alkali-detachable group, and in each case with or without interruption by 1 or 2 unadjacent oxygen atoms, imino or $C_1$–$C_4$-alkylimino groups, or $U^2$ and $U^3$ are together with the linking nitrogen atom pyrrolidinyl, piperidinyl, morpholinyl, piperazinyl or N—($C_1$–$C_4$-alkyl)piperazinyl, or $U^2$ can also be a radical of the formula

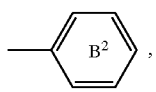, and the rings $B^1$ and $B^2$ may each be mono- or disubstituted by hydroxysulfonyl and/or benzofused, and the ring $B^2$ may independently be mono- or disubstituted by chlorine, nitro, $C_1$–$C_4$-alkyl, $C_1$–$C_4$-alkoxy, cyano, carboxyl, acetylamino, hydroxysulfonylmethyl or a radical of the formula $CH_2$—$SO_2$—Y, $SO_2$—Y, NH—CO—Y or $NU^2$—CO—$NU^2$—$L^3$—$SO_2$—Y, where Y and $U^2$ are each as defined above and $L^3$ is $C_2$–$C_6$-alkylene with or without substitution by hydroxyl, chlorine, cyano, carboxyl, $C_1$–$C_4$-alkoxycarbonyl, $C_1$–$C_4$-alkanoyloxy or sulfato and with or without interruption by 1 or 2 oxygen atoms in ether function or imino or $C_1$–$C_4$-alkylimino groups.

Examples of additively reacting fiber-reactive radicals are acryloyl, mono-, di- or trichloroacryloyl, mono-, di- or tribromoacryloyl, —CO—CCl=CH—COOH, —CO—CH=CCl—COOH, 2-chloropropionyl, 1,2-dichloropropionyl, 1,2-dibromopropionyl, 3-phenylsulfonylpropionyl, 3-methylsulfonylpropionyl, 2-sulfatoethylaminosulfonyl, 2-chloro-2,3,3-trifluorocyclobutylcarbonyl, 2,2,3,3-tetrafluorocyclobutylcarbonyl, 2,2,3,3-tetrafluorocyclobutylsulfonyl, 2-(2,2,3,3-tetrafluorocyclobutyl)acryloyl, 1- or 2-alkyl- or 1- or 2-arylsulfonylacryloyl, such as 1- or 2-methylsulfonylacryloyl, or a radical of the formula $SO_2$—Y, CONH—$L^4$—$SO_2$—Y or NHCONH—$L^4$—$SO_2$—Y, where Y is as defined above and $L^4$ is $C_1$–$C_4$-alkylene or phenylene.

Q is for example chlorine, bromine, $C_1$–$C_4$-alkylsulfonyl, phenylsulfonyl, $OSO_3H$, $SSO_3H$, $OP(O)(OH)_2$, $C_1$–$C_4$-alkylsulfonyloxy, phenylsulfonyloxy, $C_1$–$C_4$-alkanoyloxy, $C_1$–$C_4$-dialkylamino or a radical of the formula

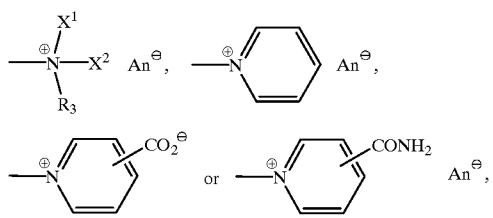

where $X^1$, $X^2$ and $X^3$ are identical or different and each is independently of the others $C_1$–$C_4$-alkyl or benzyl and $An^\ominus$ is in each case one equivalent of an anion. Examples of suitable anions are fluoride, chloride, bromide, iodide, mono-, di- or trichloroacetate, methanesulfonate, benzenesulfonate or 2- or 4-methylbenzenesulfonate.

Chr is a monovalent chromophore residue derived from a metallized or unmetallized mono- or disazo dye, from a triphendioxazine, from an anthraquinone, from a metallized formazan or from a metallized phthalocyanine.

Important coupling components of the mono- or disazo dyes HK are derived for example from compounds of the benzene, naphthalene, pyrazole, pyridine, pyrimidine, indole or N-arylacetoacetamide series and can bear fiber-reactive groups.

Important diazo components D—$NH_2$ of the mono- or disazo dyes are derived for example from compounds of the aniline or aminonaphthalene series and can bear fiber-reactive groups.

Suitable azo dyes from which such radicals are derived are known per se and have been described in large numbers, for example in K. Venkataraman, The Chemistry of Synthetic Dyes, Vol. VI, Academic Press, New York, London, 1972. The azo dyes conform to the formula II

where D is the radical of a diazo component, K is the radical of a coupling component and l is 0 or 1 and where, l is 1, the radicals D are identical or different from each other. Attachment to the cynanuric halide can be via amino or imino groups not only of the diazo component but also of coupling component.

Useful dyes from which the Chr residue is derived are for example water-soluble azo dyes, especially monoazo dyes of the formula II (l=0), which may have hydroxysulfonyl and/or carboxyl groups.

The Chr residue is preferably derived from unmetallized azo dyes, especially from those containing hydroxysulfonyl and/or carboxyl groups, of which those having from 1 to 4 hydroxysulfonyl groups are to be particularly emphasized.

Important azo dyes from which the Chr residue is derived are for example those of the phenyl-azo-naphthalene, phenyl-azo-1-phenylpyrazol-5-one, phenyl-azo-benzene, naphthyl-azo-benzene, phenyl-azo-aminonaphthalene, naphthyl-azo-naphthalene, naphthyl-azo-1-phenylpyrazol-5-one, phenyl-azo-pyridone, phenyl-azo-aminopyridine, naphthyl-azo-pyridone, naphthyl-azo-aminopyridine or stilbyl-azo-benzene series.

Radicals $D^1$ of diazo components of the aniline or aminonaphthalene series which do not bear fiber-reactive groups are derived for example from amines of the formulae IIIa–f

(IIIa)

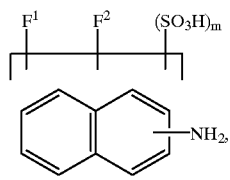

(IIIb)

-continued

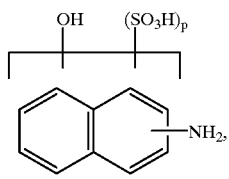
(IIIc)

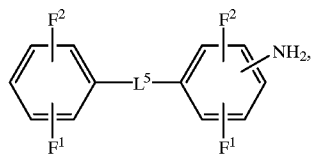
(IIId)

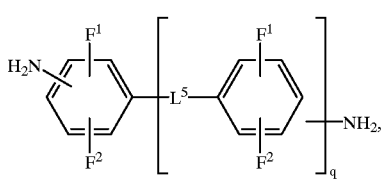
(IIIe)

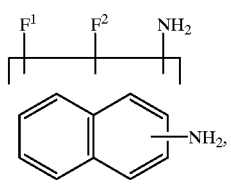
(IIIf)

where
m is 0, 1, 2 or 3,
p is 0, 1 or 2,
q is 0 or 1,
$F^1$ is hydrogen, $C_1$–$C_4$-alkyl, $C_1$–$C_4$-alkoxy, acetyl, cyano, carboxyl, hydroxysulfonyl, $C_1$–$C_4$-alkoxycarbonyl, hydroxyl, carbamoyl, mono- or di-($C_1$–$C_4$)alkylcarbamoyl, fluorine, chlorine, bromine or trifluoromethyl,
$F^2$ is hydrogen, $C_1$–$C_4$-alkyl, $C_1$–$C_4$-alkoxy, hydroxymethyl, cyano, carboxyl, hydroxysulfonyl, acetylamino, $C_1$–$C_4$-alkoxycarbonyl, carbamoyl, mono- or di-($C_1$–$C_4$)alkylcarbamoyl, fluorine, chlorine, nitro, sulfamoyl, $C_1$–$C_4$-mono- or dialkylsulfamoyl, $C_1$–$C_4$-alkylsulfonyl, phenylsulfonyl or phenoxy and
$L^5$ is a direct bond, oxygen, sulfur or a radical of the formula —NHCO—, —NHCONH—, —CONH—, —CO—, —NHSO$_2$—, —SO$_2$NH—, —SO$_2$—, —CH=CH—, —CH$_2$—CH$_2$—, —CH$_2$—, —NH—, or —N=N—.

Preference is given to those components in which $F^1$ is hydrogen, methyl, methoxy, carboxyl, hydroxysulfonyl, hydroxyl or chlorine, $F^2$ is hydrogen, methyl, methoxy, carboxyl, hydroxysulfonyl, acetylamino or chlorine, and $L^5$ is a radical of the formula —CO—, —SO$_2$—, —CH=CH—, —CH$_2$—CH$_2$—, —CH$_2$— or —N=N—.

Aromatic amines suitable for use as diazo components are for example aniline, 2-methoxyaniline, 2-methylaniline, 4-chloro-2-aminoanisole, 4-methylaniline, 4-methoxyaniline, 2-methoxy-5-methylaniline, 2,5-dimethoxyaniline, 2,5-dimethylaniline, 2,4-dimethylaniline, 2,5-diethoxyaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 4-phenylsulfonylaniline, 2-ethoxy-1-naphthylamine, 1-naphthylamine, 2-naphthylamine, 4-methylsulfonylaniline, 2,4-dichloroaniline-5-carboxylic acid, 2-aminobenzoic acid, 4-aminobenzoic acid, 3-aminobenzoic acid, 3-chloroaniline-6-carboxylic acid, aniline-2- or -3- or -4-sulfonic acid, aniline-2,5-disulfonic acid, aniline-2,4-disulfonic acid, aniline-3,5-disulfonic acid, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4-sulfonic acid, 4-hydroxysulfonyl-2-aminobenzoic acid, 2,5-dimethoxyaniline- 4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3- or -4-sulfonic acid, 3-acetylaminoaniline-6-sulfonic acid, 4-acetylaminoaniline-2-sulfonic acid, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5- or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 2-aminophenol-4-sulfonic acid, 2-aminophenol-5-sulfonic acid, 3-aminophenol-6-sulfonic acid, 1-hydroxy-2-aminonaphthalene-5,8- or -4,6-disulfonic acid, 4-aminodiphenylamine, 4-amino-4'-methoxydiphenylamine, 4-amino-4'-methoxydiphenylamine-3-sulfonic acid, 4-(2'-methylphenylazo)-2-methylaniline, 4-aminoazobenzene, 4'-nitrophenylazo-1-aminonaphthalene, 4-(6'-hydroxysulfonylnaphthylazo)-1-aminonaphthalene, 4-(2',5'-dihydroxysulfonylphenylazo)-1-aminonaphthalene, 4'-amino-3'-methyl-3-nitrobenzophenone, 4-aminobenzophenone, 4-(4'-aminophenylazo)benzenesulfonic acid, 4-(4'-amino-3'-methoxyphenylazo)benzenesulfonic acid or 2-ethoxy-1-naphthylamine-6-sulfonic acid.

Aromatic diamines suitable for use as tetraazo components or else for coupling to cyanuric halide are for example 1,3-diaminobenzene, 1,3-diaminobenzene-4-sulfonic acid, 1,4-diaminobenzene, 1,4-diaminobenzene-2-sulfonic acid, 1,4-diamino-2-methylbenzene, 1,4-diamino-2-methoxybenzene, 1,3-diamino-4-methylbenzene, 1,3-diaminobenzene-5-sulfonic acid, 1,3-diamino-5-methylbenzene, 1,6-diaminonaphthalene-4-sulfonic acid, 2,6-diaminonaphthalene-4,8-disulfonic acid, 3,3'-diaminodiphenyl sulfone, 4,4'-diaminodiphenyl sulfone, 4,4'-diaminostilbene-2,2'-disulfonic acid, 2,2'-diaminodiphenyl sulfone, 2,2'-sulfonyldianiline-4,5-disulfonic acid, 4,4'-diaminobenzophenone, 4,4'-diamino-3,3'-dinitrobenzophenone, 3,3'-diamino-4,4'-dichlorobenzophenone, 4,4,'- or 3,3'-diaminobiphenyl, 4,4'-diamino-3,3'-dichlorobiphenyl, 4,4'-diamino-3,3'-dimethoxy- or -3,3'-dimethyl- or -2,2'-dimethyl- or -2,2'-dichloro- or -3,3'-diethoxy-biphenyl, 4,4'-diamino-3,3'- dimethyl-6,6'-dinitrobiphenyl, 4,4'-diaminobiphenyl-2,2'- or -3,3'-disulfonic acid, 4,4'-diamino-3,3'-dimethyl- or -3,3'-dimethoxy- or -2,2'-dimethoxy-biphenyl-6,6'-disulfonic acid, 4,4'-diamino-2,2',5,5,'-tetrachlorobiphenyl, 4,4'-diamino-3,3'-dinitrobiphenyl, 4,4'-diamino-2,2'-dichloro-5,5'-dimethoxybiphenyl, 4,4'-diaminobiphenyl-2,2'- or -3,3'-dicarboxylic acid, 4,4'-diamino-3,3'-dimethylbiphenyl-5,5'-disulfonic acid, 4,4'-diamino-2-nitrobiphenyl, 4,4'-diamino-3-ethoxy- or -3-hydroxy-sulfonylbiphenyl, 4,4'-diamino-3,3'-dimethylbiphenyl-5-sulfonic acid, 4,4'-diaminodiphenylmethane, 4,4'-diamino-3,3'-dimethyldiphenylmethane, 4,4'-diamino-2,2',3,3'-tetramethyldiphenylmethane, 4,4'-diaminodiphenylethane, 4,4'-diaminostilbene or 4,4,-diaminodiphenylmethane-3,3,-dicarboxylic acid.

Aromatic radicals $D^2$ of diazo components of the aniline or aminonaphthalene series which bear further fiber-reactive radicals are derived for example from amines of the formulae VIa–c

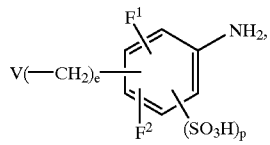
(IVa)

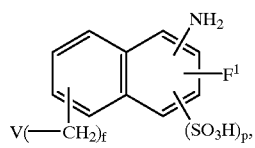
(IVb)

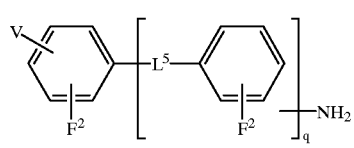
(IVc)

where $F^1$, $F^2$, p, q and $L^5$ are each as defined above, e and f are identical or different and each is independently of the other 0 or 1, and V is an additively or substitutively reacting fiber-reactive radical.

Aromatic amines which form the basis of the derivatives of the formula IVa, IVb or IVc which have a fiber-reactive radical V include for example 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, 1,6-diaminonaphth-2-ol-4-sulfonic acid, 1,6-diaminonaphthalene-4-sulfonic acid, 2,6-diaminonaphthalene-4,8-disulfonic acid, 2,6-diaminonaphth-1-ol-4,8-disulfonic acid, 1,3-diaminobenzene-5-sulfonic acid, 1,3-diamino-5-methylbenzene, 2,6-diaminophenol-4-sulfonic acid, 5-aminomethyl-2-aminonaphthalene-1-sulfonic acid, 5-(N-methylaminomethyl)-2-aminonaphthalene-1-sulfonic acid, 4,4'-diaminostilbene-3,3'-dicarboxylic acid, 4-(N-methylaminomethyl)aniline-2-sulfonic acid or 3-(N-methylaminomethyl)aniline-6-sulfonic acid.

Coupling components free of fiber-reactive groups are preferably compounds of the naphthalene, aniline, pyrazolone, aminopyrazole, 2,6-diaminopyridine, pyridone, hydroxypyrimidine, indole, N-arylacetoacetamide series and correspond for example to the compounds of the formulae V a–m

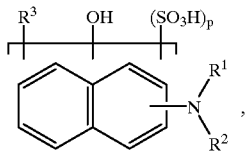
(Va)

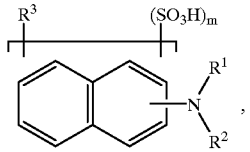
(Vb)

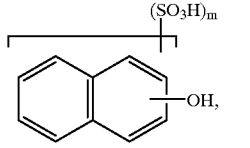
(Vc)

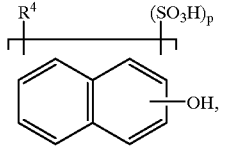
(Vd)

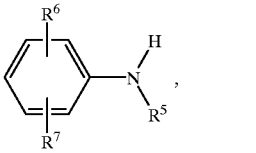
(Ve)

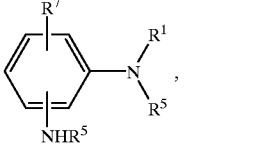
(Vf)

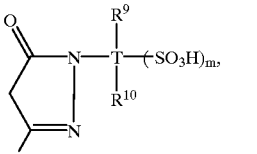
(Vg)

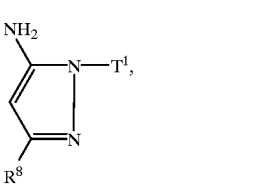
(Vh)

-continued

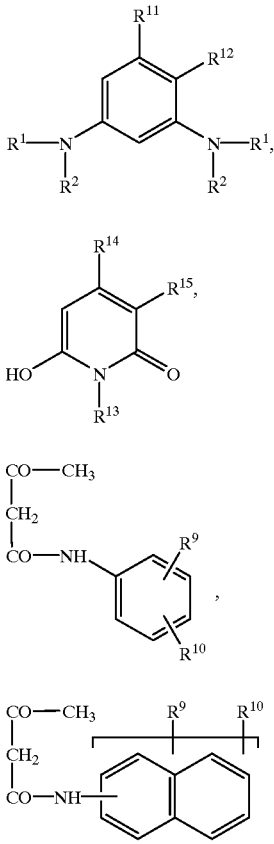

where
m is 0, 1, 2 or 3,
p is 0, 1 or 2,
$R^1$ is hydrogen or $C_1$–$C_4$-alkyl, unsubstituted or hydroxyl-, cyano-, carboxyl-, hydroxysulfonyl-, sulfato-, methoxycarbonyl-, ethoxycarbonyl- or acetoxy-substituted,
$R^2$ is hydrogen, $C_1$–$C_4$-alkyl, unsubstituted or hydroxyl-, cyano-, carboxyl-, hydroxysulfonyl-, sulfato-, methoxycarbonyl-, ethoxycarbonyl- or acetoxy-substituted, benzyl or unsubstituted or $C_1$–$C_4$-alkyl-, $C_1$–$C_4$-alkoxy-, chlorine- or hydroxysulfonyl-substituted phenyl,
$R^3$ is hydrogen or unsubstituted or hydroxysulfonyl- or carboxyl-substituted $C_1$–$C_4$-alkyl,
$R^4$ is $C_1$–$C_6$-alkylureido, phenylureido, unsubstituted or chlorine-, methyl-, methoxy-, nitro-, hydroxysulfonyl- or carboxyl-substituted, $C_1$–$C_6$-alkanoylamino, unsubstituted or hydroxysulfonyl- or chlorine-substituted, cyclohexylcarbonylamino, benzoylamino, unsubstituted or chlorine-, methyl-, methoxy-, nitro-, hydroxysulfonyl- or carboxyl-substituted, or hydroxyl,
$R^5$ is hydrogen, $C_1$–$C_6$-alkyl, especially $C_1$–$C_4$-alkyl, both unsubstituted or phenyl-, $C_1$–$C_4$-alkoxy-, hydroxyl-, phenoxy- or $C_1$–$C_4$-alkanoyloxy-substituted, $C_5$–$C_7$-cycloalkyl, hydroxysulfonylphenyl, $C_1$–$C_4$-alkanoyl, carbamoyl, mono- or di-($C_1$–$C_4$)-alkylcarbamoyl, phenylcarbamoyl or cyclohexylcarbamoyl,
$R^6$ is $C_1$–$C_4$-alkoxy, chlorine, bromine, hydroxysulfonyl, $C_1$–$C_4$-alkanoylamino, amino, ureido, methylsulfonylamino, ethylsulfonylamino, dimethylaminosulfonylamino, methylamino, ethylamino, dimethylamino or diethylamino,
$R^7$ is hydrogen, $C_1$–$C_4$-alkyl, $C_1$–$C_4$-alkoxy, hydroxysulfonyl, chlorine or bromine,
T is the radical of a benzene or naphthalene ring,
$T^1$ is $C_1$–$C_4$-alkyl, cyclohexyl, benzyl or unsubstituted or fluorine-, chlorine-, bromine-, methoxy-, nitro-, hydroxysulfonyl-, carboxyl-, acetyl-, acetylamino-, methylsulfonyl-, sulfamoyl- or carbamoyl-monosubstituted, -disubstituted or -trisubstituted phenyl,
$R^8$ is methyl, carboxyl, $C_1$–$C_4$-alkoxycarbonyl or phenyl,
$R^9$ is hydrogen, $C_1$–$C_4$-alkyl, $C_1$–$C_4$-alkoxy, acetyl, cyano, carboxyl, hydroxysulfonyl, $C_1$–$C_4$-alkoxycarbonyl, hydroxyl, carbamoyl, mono- or di-($C_1$–$C_4$)-alkylcarbamoyl, fluorine, chlorine, bromine or trifluoromethyl,
$R^{10}$ is hydrogen, $C_1$–$C_4$-alkyl, $C_1$–$C_4$-alkoxy, cyano, carboxyl, hydroxysulfonyl, acetylamino, $C_1$–$C_4$-alkoxycarbonyl, carbamoyl, mono- or di-($C_1$–$C_4$)-alkylcarbamoyl, fluorine, chlorine, nitro, sulfamoyl, mono- or di-($C_1$–$C_4$)-alkylsulfamoyl, $C_1$–$C_4$-alkylsulfonyl, phenylsulfonyl or phenoxy,
$R^{11}$ is hydrogen or unsubstituted or $C_1$–$C_4$-alkoxy- or cyano-substituted $C_1$–$C_4$-alkyl,
$R^{12}$ is hydrogen, methyl, hydroxysulfonylmethyl, hydroxysulfonyl, cyano or carbamoyl,
$R^{13}$ is hydrogen, $C_1$–$C_4$-alkyl, unsubstituted or phenyl-, hydroxysulfonylphenyl-, hydroxyl-, amino-, $C_1$–$C_4$-alkoxy-, carboxyl-, hydroxysulfonyl-, acetylamino-, benzoylamino- or cyano-substituted, cyclohexyl, phenyl, unsubstituted or carboxyl-, hydroxysulfonyl-, benzoylamino-, acetylamino-, methyl-, methoxy-, cyano- or chlorine-substituted, or phenyl-, $C_1$–$C_4$-alkyl-, $C_1$–$C_4$-alkanoyl- or benzoyl-substituted amino,
$R^{14}$ is hydrogen, $C_1$–$C_4$-alkyl, phenyl, hydroxyl, cyano, acetyl, benzoyl, carboxyl, methoxycarbonyl, carbamoyl or hydroxysulfonylmethyl and
$R^{15}$ is hydrogen, chlorine, bromine, acetylamino, amino, nitro, hydroxysulfonyl, sulfamoyl, methylsulfonyl, phenylsulfonyl, carboxyl, $C_1$–$C_4$-alkoxycarbonyl, $C_1$–$C_4$-alkanoyl, benzoyl, carbamoyl, cyano or hydroxysulfonylmethyl.

$U^2$, $U^3$, $F^1$, $F^2$, $R^1$, $R^2$, $R^3$, $R^5$, $R^7$, $T^1$, $R^9$, $R^{10}$, $R^{11}$, $R^{13}$ and $R^{14}$ and also the below-described radicals $G^3$, $G^5$, $G^{12}$ and $G^{13}$ are each for example methyl, ethyl, propyl, isopropyl, butyl, isobutyl, sec-butyl or tert-butyl.

$U^2$, $U^3$ and $R^5$ may each also be pentyl, isopentyl, neopentyl, tert-pentyl, hexyl or 2-methylpentyl.

$U^2$, $U^3$, $R^1$, $R^2$, $R^5$ and $R^{13}$ are each hydroxy-$C_1$–$C_4$-alkyl such as hydroxymethyl, 1-hydroxyeth-1-yl, 2-hydroxyeth-1-yl, 1-hydroxyprop-1-yl, 2-hydroxyprop-1-yl, 3-hydroxyprop-1-yl, 1-hydroxyprop-2-yl, 2-hydroxyprop-2-yl, 1-hydroxybut-1-yl, 2-hydroxybut-1-yl, 3-hydroxybut-1-yl, 4-hydroxybut-1-yl, 1-hydroxybut-2-yl, 2-hydroxybut-2-yl, 1-hydroxybut-3-yl, 2-hydroxybut-3-yl, 1-hydroxy-2-methylprop-3-yl, 2-hydroxy-2-methylprop-3-yl, 3-hydroxy-2-methylprop-3-yl or 2-hydroxymethylprop-2-yl.

$U^2$, $U^3$, $R^1$, $R^2$, $R^{11}$ and $R^{13}$ may each also be for example cyanomethyl, cyanoethyl, 2- or 3-cyanopropyl or 2- or 4-cyanobutyl.

$R^1$, $R^2$, $R^3$ and $R^{13}$ are each for example carboxymethyl, carboxyethyl, 2- or 3-carboxypropyl or 2- or 4-carboxybutyl.

$U^2$, $U^3$, $R^1$, $R^2$ and $R^3$ may each also be for example hydroxysulfonylmethyl, 2-hydroxysulfonylethyl, 2- or 3-hydroxysulfonylpropyl, 2- or 4-hydroxysulfonylbutyl.

$R^1$ and $R^2$ may each also be for example 2-sulfatoethyl, 2- or 3-sulfatopropyl, 2- or 4-sulfatobutyl, methoxycarbonylmethyl, 2-methoxycarbonylethyl, 2- or 3-methoxycarbonylpropyl, 2- or 4-methoxycarbonylbutyl, ethoxycarbonylmethyl, 2-ethoxycarbonylethyl, 2- or 3-ethoxycarbonylpropyl, 2- or 4-ethoxycarbonylbutyl, acetoxymethyl, 2-acetoxyethyl, 2- or 3-acetoxypropyl, 2- or 4-acetoxybutyl.

$R^2$ may also be for example 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2-, 3- or 4-isobutylphenyl, 2-, 3- or 4-sec-butylphenyl, 2-, 3- or 4-tert-butylphenyl, 2-, 3- or 4-methoxyphenyl, 2-, 3- or 4-ethoxyphenyl, 2-, 3- or 4-propoxyphenyl, 2-, 3- or 4-isopropoxyphenyl, 2-, 3- or 4-butoxyphenyl, 2-, 3- or 4-isobutoxyphenyl, 2-, 3- or 4-sec-butoxyphenyl, 2-, 3- or 4-tert-butoxyphenyl, 2-, 3- or 4-chlorophenyl.

$R^2$, $R^5$ and $T^1$ may each also be for example 2-, 3- or 4-hydroxysulfonylphenyl.

$R^4$ is for example methylureido, ethylureido, propylureido, butylureido, pentylureido, hexylureido, formylamino, acetylamino, propionylamino, butyrylamino, isopropylcarbonylamino, valerylamino, isobutylcarbonylamino, sec-butylcarbonylamino, tert-butylcarbonylamino, pentylcarbonylamino.

$R^5$ and $R^{13}$ may each be for example benzyl, 1-phenylethyl, 2-phenylethyl, 1-phenylprop-1-yl, 2-phenylprop-1-yl, 3-phenylprop-1-yl, 1-phenylbut-1-yl, 2-phenylbut-1-yl, 3-phenylbut-1-yl, 4-phenylbut-1-yl, 1-phenylbut-2-yl, 2-phenylbut-2-yl, 3-phenylbut-2-yl, 3-phenylbut-2-yl, 4-phenylbut-2-yl, 1-(phenylmethyl)-eth-1-yl, 1-(phenylmethyl)-1-(methyl)-eth-1-yl or 1-(phenylmethyl)-prop-1-yl, preferably benzyl or 2-phenylethyl.

$R^5$, $R^{11}$ and $R^{13}$ may each also be for example methoxymethyl, ethoxymethyl, n-propoxymethyl, (1-methylethoxy)methyl, n-butoxymethyl, (1-methylpropoxy)methyl, (2-methylpropoxy)methyl, (1,1-dimethylethoxy)methyl, 2-(methoxy)ethyl, 2-(ethoxy)ethyl, 2-(n-propoxy)ethyl, 2-(1-methoxyethoxy)ethyl, 2-(n-butoxy)ethyl, 2-(1-methoxypropoxy)ethyl, 2-(2-methylpropoxy)ethyl, 2-(1,1-dimethylethoxy)ethyl, 2-(methoxy)propyl, 2-(ethoxy)propyl, 2-(n-propoxy)propyl, 2-(1-methylethoxy)propyl, 2-(n-butoxy)propyl, 2-(1-methylpropoxy)propyl, 2-(2-methylpropoxy)propyl, 2-(1,1-dimethylethoxy)propyl, 3-(methoxy)propyl, 3-(ethoxy)propyl, 3-(n-propoxy)propyl, 3-(1-methylethoxy)propyl, 3-(n-butoxy)propyl, 3-(1-methylpropoxy)propyl, 3-(2-methylpropoxy)propyl, 3-(1,1-dimethylethoxy)propyl, 2-(methoxy)butyl, 2-(ethoxy)butyl, 2-(n-propoxy)butyl, 2-(1-methylethoxy)butyl, 2-(n-butoxy)butyl, 2-(1-methylpropoxy)butyl, 2-(2-methylpropoxy)butyl, 2-(1,1-dimethylethoxy)butyl, 3-(methoxy)butyl, 3-(ethoxy)butyl, 3-(n-propoxy)butyl, 3-(1-methylethoxy)butyl, 3-(n-butoxy)butyl, 3-(1-methylpropoxy)butyl, 3-(2-methylpropoxy)butyl, 3-(1,1-dimethylethoxy)butyl, 4-(methoxy)butyl, 4-(ethoxy)butyl, 4-(n-propoxy)butyl, 4-(1-methylethoxy)butyl, 4-(n-butoxy)butyl, 4-(1-methylpropoxy)butyl, 4-(2-methylpropoxy)butyl or 4-(1,1-dimethylethoxy)butyl.

$R^5$ may also be for example phenoxymethyl, 2-phenoxyethyl, 2- or 3-phenoxypropyl, 2- or 4-phenoxybutyl, formyloxymethyl, 2-(formyloxy)ethyl, 2- or 3-(formyloxy)propyl, 2- or 4-(formyloxy)butyl, methylcarbonyloxymethyl, 2-(methylcarbonyloxy)ethyl, 2- or 3-(methylcarbonyloxy)propyl, 2- or 4-(methylcarbonyloxy)butyl, ethylcarbonyloxymethyl, 2-(ethylcarbonyloxy)ethyl, 2- or 3-(ethylcarbonyloxy) propyl, 2- or 4-(ethylcarbonyloxy)butyl, propylcarbonyloxymethyl, 2-(propylcarbonyloxy)ethyl, 2- or 3-(propylcarbonyloxy)propyl, 2- or 4-(propylcarbonyloxy)butyl, cyclopentyl, cyclohexyl, cycloheptyl.

$R^5$, $R^{15}$ and also the below-described radicals $G^4$ are each for example formyl, acetyl, propionyl, butyryl, isobutyryl.

$F^1$, $F^2$, $R^5$, $R^9$, $R^{10}$ and also the below-described radicals $G^4$ are each for example mono- or dimethylcarbamoyl, mono- or diethylcarbamoyl, mono- or dipropylcarbamoyl, mono- or dibutylcarbamoyl.

$F^1$, $F^2$, $R^6$, $R^7$, $R^9$, $R^{10}$ and also the below-described radicals $G^3$ and $G^5$ can each also be for example methoxy, ethoxy, propoxy, isopropoxy, butoxy, sec-butoxy, isobutoxy, tert-butoxy.

$R^6$ and $R^{13}$ are each for example formylamino, methylcarbonylamino, ethylcarbonylamino, propylcarbonylamino, isopropylcarbonylamino.

$T^1$ may also be for example 2-, 3- or 4-fluorophenyl, 2-, 3- or 4-chlorophenyl, 2-, 3- or 4-bromophenyl, 2-, 3- or 4-methoxyphenyl, 2-, 3- or 4-nitrophenyl, 2-, 3- or 4-carboxyphenyl, 2-, 3- or 4-acetylphenyl, 2-, 3- or 4-acetylaminophenyl, 2-, 3- or 4-methylsulfonylphenyl, 2-, 3- or 4-sulfamoylphenyl or 2-, 3- or 4-carbamoylphenyl.

$F^1$, $F^2$, $R^8$, $R^9$, $R^{10}$, $R^{15}$ and also the below-described radicals $R^{16}$ may also be for example methoxycarbonyl, ethoxycarbonyl, propoxycarbonyl, isopropoxycarbonyl, butoxycarbonyl, isobutoxycarbonyl, sec-butoxycarbonyl or tert-butoxycarbonyl.

$F^2$ and $R^{10}$ may also be for example mono- or dimethylsulfamoyl, mono- or diethylsulfamoyl, mono- or dipropylsulfamoyl, mono- or dibutylsulfamoyl, methylsulfonyl, ethylsulfonyl, propylsulfonyl or butylsulfonyl.

$R^{13}$ may also be for example hydroxysulfonylphenylmethyl, 2-hydroxysulfonylphenylethyl, 2- or 3-hydroxysulfonylphenylpropyl, 2- or 4-hydroxysulfonylphenylbutyl, aminomethyl, 2-aminoethyl, 2- or 3-aminopropyl, 2- or 4-aminobutyl, hydroxysulfonylmethyl, 2-hydroxysulfonylethyl, 2- or 3-hydroxysulfonylpropyl, 2- or 4-hydroxysulfonylbutyl, acetylaminomethyl, 2-acetylaminoethyl, 2- or 3-acetylaminopropyl, 2- or 4-acetylaminobutyl, benzoylaminomethyl, 2-benzoylaminoethyl, 2- or 3-benzoylaminopropyl, 2- or 4-benzoylaminobutyl, 2-, 3- or 4-carboxyphenyl, 2-, 3- or 4-hydroxysulfonylphenyl, 2-, 3- or 4-benzoylaminophenyl, 2-, 3- or 4-acetylaminophenyl, 2-, 3- or 4-methylphenyl, 2-, 3- or 4-methoxyphenyl, 2-, 3- or 4-cyanophenyl, 2-, 3- or 4-chlorophenyl, phenylamino, methylamino, ethylamino, propylamino, isopropylamino, butylamino, isobutylamino, sec-butylamino, tert-butylamino or benzoylamino.

The radicals $L^3$ and also the below-described radicals $L^6$ are each for example $(CH_2)_2$, $(CH_2)_3$, $(CH_2)_4$, $CH(CH_3)CH_2$, $CH(CH_3)CH(CH_3)$, $(CH_2)_5$ or $(CH_2)_6$.

$L^3$ may also be for example $(CH_2)_2O(CH_2)_2$, $(CH_2)_3O(CH_2)_2$, $(CH_2)_2O(CH_2)_2O(CH_2)_2$, $(CH_2)_2S(CH_2)_2$, $(CH_2)_3S(CH_2)_2$, $(CH_2)_2S(CH_2)_2S(CH_2)_2$, $(CH_2)_2NH(CH_2)_2$, $(CH_2)_3NH(CH_2)_2$, $(CH_2)_2NH(CH_2)_2NH(CH_2)_2$,

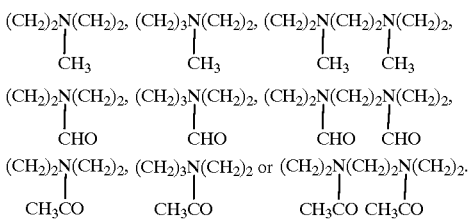

$L^4$ is $CH_2$, $(CH_2)_2$, $(CH_2)_3$, $(CH_2)_4$, $CH(CH_3)CH_2$ or $CH(CH_3)CH(CH_3)$.

In what follows, coupling components KH are recited by way of example. Specific examples of naptholsulfonic acids are 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1,8-dihydroxynaphthalene-3,6-disulfonic acid, 2,6-dihydroxynaphthalene-8-sulfonic acid and 2,8-dihydroxynaphthalene-6-sulfonic acid.

Further examples are 1-naphthylamine, N-phenyl-1-naphthylamine, N-ethyl-1-naphthylamine, N-phenyl-2-naphthylamine, 1-naphthol, 2-naphthol, 1,5-dihydroxynaphthalene, 1,6-dihydroxynaphthalene, 1,7-dihydroxynaphthalene and 2,7-dihydroxynaphthalene.

Examples of aminonaphthalenesulfonic acids are 1-naphthylamine-6-sulfonic acid, 1-naphthylamine-7-sulfonic acid, 1-naphthylamine-8-sulfonic acid, 2-naphthylamine-3,6-disulfonic acid, 2-naphthylamine-5,7-disulfonic acid, 2-naphthylamine-6,8-disulfonic acid, 2-hydroxysulfonylmethylaminonaphthalene-5-sulfonic acid and 2-hydroxysulfonylmethylaminonaphthalene-6-sulfonic acid.

Examples of aminonaphtholsulfonic acids are 1-amino-5-hydroxynaphthalene-7-sulfonic acid, 1-amino-8-hydroxynaphthalene-4-sulfonic acid, 1-amino-8-hydroxynaphthalene-2,4-disulfonic acid, 1-amino-8-hydroxynaphthalene-3,6-disulfonic acid, 1-amino-8-hydroxynaphthalene-4,6-isulfonic acid, 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 3-amino-7-hydroxysulfonylmethyl-8-hydroxynaphthalene-3,6-disulfonic acid, 2-amino-7-hydroxysulfonylmethyl-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 1-acetylamino-5-hydroxynaphthalene-7-sulfonic acid, 2-methylamino-8-hydroxynaphthalene-6-sulfonic acid, 2-hydroxysulfonylmethylamino-8-hydroxynaphthalene-6-sulfonic acid, 2-hydroxysulfonylmethylamino-7-hydroxysulfonylmethyl-8-hydroxynaphthalene-6-sulfonic acid, 2-(3'- or 4'-hydroxysulfonylphenylamino)-8-hydroxynaphthalene-6-sulfonic acid and 2-acetylamino-5-hydroxynaphthalene-7-sulfonic acid and 2-acetylamino-8-hydroxynaphthalene-6-sulfonic acid.

Examples of benzene coupling components are o- or m-toluidine, o- or m-anisidine, cresidine, 2,5-dimethylaniline, 2,5-dimethoxyaniline, m-aminoacetanilide, 3-amino-4-methoxyacetanilide, 3-amino-4-methylacetanilide, m-aminophenylurea, N-methylaniline, N-methyl-m-toluidine, N-ethylaniline, N-ethyl-m-toluidine, N-(2-hydroxyethyl)aniline and N-(2-hydroxyethyl)-m-toluidine.

Examples of pyrazolone coupling components are 3-methyl-, 3-carboxy- or 3-($C_1$–$C_4$-alkoxycarbonyl)-pyrazol-5-ones with or without substitution in position 1 by unsubstituted or methyl-, ethyl-, fluorine-, chlorine-, bromine-, trifluoromethyl-, methoxy-, ethoxy-, cyano-, phenoxy-, phenylsulfonyl-, methylsulfonyl-, hydroxysulfonyl-, acetylamino-, nitro-, hydroxyl-, carboxyl-, carbamoyl- or sulfamoyl-substituted phenyl or by hydroxysulfonyl-substituted 1- or 2-naphthyl. Examples are 1-phenyl-, 1-(2'-chlorophenyl)-, 1-(2'-methoxyphenyl)-, 1-(2'-methylphenyl)-, 1-(1',5'-dichlorophenyl)-, 1-(2',6'-dichlorophenyl)-, 1-(2'- methyl-6'-chlorophenyl)-, 1-(2'-methoxy-5'-methylphenyl)-, 1-(2'-methoxy-5'-hydroxysulfonylphenyl)-, 1-(2',5'-dichloro-4'-hydroxysulfonylphenyl)-, 1-(2',5'-dihydroxysulfonylphenyl)-, 1-(2'-carboxyphenyl)-, 1-(3'-hydroxysulfonylphenyl)-, 1-(4'-hydroxysulfonylphenyl)- or 1-(3'-sulfamoylphenyl)-3-carboxypyrazol-5-one, 1-(3'- or 4'-hydroxysulfonylphenyl)-, 1-(2'-chloro-4'- or -5'-hydroxysulfonylphenyl)-, 1-(2'-methyl-4'-hydroxysulfonylphenyl)-, 1-(2',5'-dichlorophenyl)-, 1-(4',8'-dihydroxysulfonyl-1-naphthyl)- or 1-(6'-hydroxysulfonyl-1-naphthyl)-3-methylpyrazol-5-one, ethyl 1-phenylpyrazol-5-one-3-carboxylate, ethyl pyrazol-5-one-3-carboxylate or pyrazol-5-one-3-carboxylic acid.

Other pyrazole coupling components include for example 1-methyl-, 1-ethyl-, 1-propyl-, 1-butyl-, 1-cyclohexyl-, 1-benzyl- or 1-phenyl-5-aminopyrazole, 1-(4'-chlorophenyl)-, 1-(4'-methylphenyl)-5-aminopyrazole or 1-phenyl-3-methy-1-5-aminopyrazole.

N-Arylacetoacetamides are particularly acetoacetanilide or its derivatives having one or more substituents selected from the group consisting of chlorine, methyl, ethyl, methoxy, ethoxy, acetylamino, hydroxysulfonyl, carboxyl, carbamoyl and sulfamoyl in the phenyl ring.

Pyridine coupling components are the derivatives described in DE-A-2 260 827, for example.

Suitable pyrimidine coupling components include for example the compounds recited in DE-A-2 202 820, DE-A-2 308 663 or DE-A-3 119 349. Also suitable are barbituric acid and its N-substitution products. Suitable N-substituents include in particular $C_1$–$C_4$-alkyl or phenyl.

Examples of suitable indole coupling components are 2-methylindole, 2-phenylindole, 2-phenylindole-5-sulfonic acid, 1-methyl-2-phenylindole, 1-(2'-hydroxyethyl)-, 1-(21-carboxyethyl)-, 1-(2'-carbamoylethyl)-2-methylindole or -2-phenylindole.

Examples of suitable pyridone coupling components are 1-ethyl-2-hydroxy-4-methyl-5-carbamoylpyrid-6-one, 1-(2'-hydroxyethyl)-2-hydroxy-4-methyl-5-carbamoylpyrid-6-one, 1-phenyl-2-hydroxy-4-methyl-5-carbamoylpyrid-6-one, 1-ethyl-2-hydroxy-4-methyl-5-cyanopyrid-6-one, 1-ethyl-2-hydroxy-4-methyl-5-hydroxysulfonylmethylpyrid-6-one, 1-methyl-2-hydroxy-4-methyl-5-cyanopyrid-6-one, 1-methyl-2-hydroxy-5-acetylpyrid-6-one, 1,4-dimethyl-2-hydroxy-5-cyanopyrid-6-one, 1,4-dimethyl-5-carbamoylpyrid-6-one, 2,6-dihydroxy-4-ethyl-5-cyanopyridine, 2-hydroxy-4-ethyl-5-carbamoylpyrid-6-one, 1-ethyl-2-hydroxy-4-methyl-5-hydroxysulfonylmethylpyrid-6-one, 1-methyl-2-hydroxy-4-methyl-5-methylsulfonylpyrid-6-one and 1-carboxymethyl-2-hydroxy-4-ethyl-5-phenylsulfonylpyrid-6-one.

Coupling components of the naphthalene, benzene, pyrazolone, aminopyrazole, 2,6-diaminopyridine, pyridone, hydroxypyrimidine, aminopyrimidine, indole or N-arylacetoacetamide series which contain a fiber-reactive group include for example compounds of the formulae VIa–k

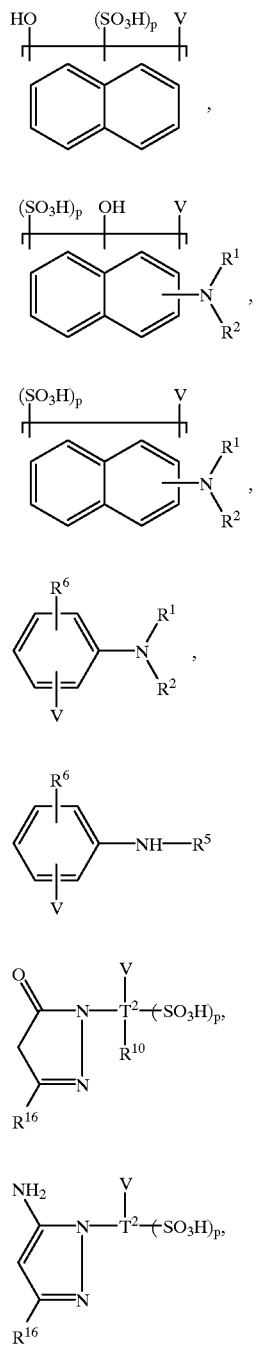
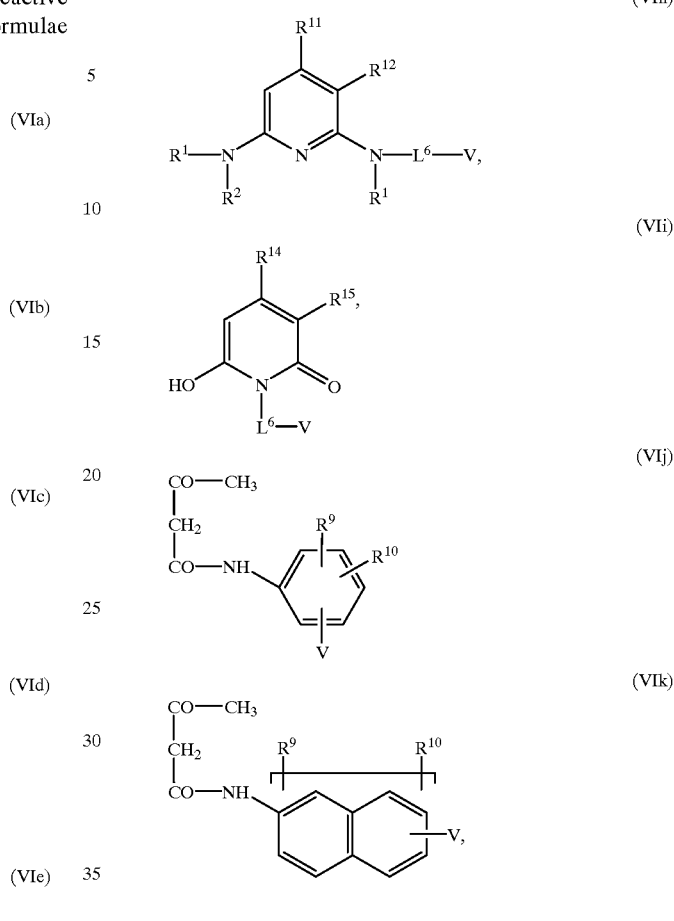

where

T² is the radical of a benzene or naphthalene ring,

R¹⁶ is methyl, carboxyl, $C_1$–$C_4$-alkoxycarbonyl or phenyl and $L^6$ is $C_1$–$C_6$-alkylene, and $R^1$, $R^2$, $R^5$, $R^6$, $R^9$, $R^{10}$, $R^{11}$, $R^{12}$, $R^{14}$, $R^{15}$, p and V are each as defined above.

Pyrazolone coupling components bearing fiber-reactive radicals V are derived for example from the following pyrazolones: 1-(3'- or 4'-aminophenyl)-, 1-(2'-hydroxysulfonyl-5'-aminophenyl)- or 1-(2'-methoxy-5'-aminophenyl)-3-carboxypyrazol-5-one, 1-(3'- or 4'-aminophenyl)- or 1-(6'-amino-4',8'-dihydroxysulfonylnaphth-2'-yl)-3-carboxypyrazol-5-one.

Particular preference is given to reactive dyes of the formula VII

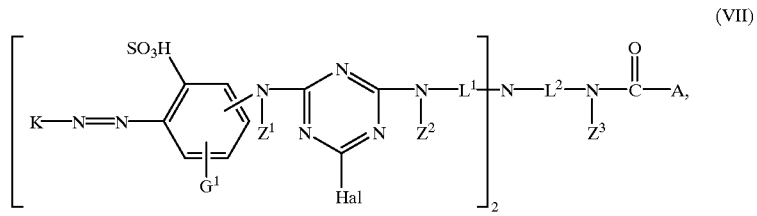

(VII)

where
K is the radical of a coupling component,
$G^1$ is hydrogen, $C_1$–$C_4$-alkyl, $C_1$–$C_4$-alkoxy, chlorine or hydroxysulfonyl and
$Z^1$, $Z^2$, $Z^3$, Hal, $L^1$, $L^2$ and A are each as defined above.

Particular preference is further given to reactive dyes of the formula VIII

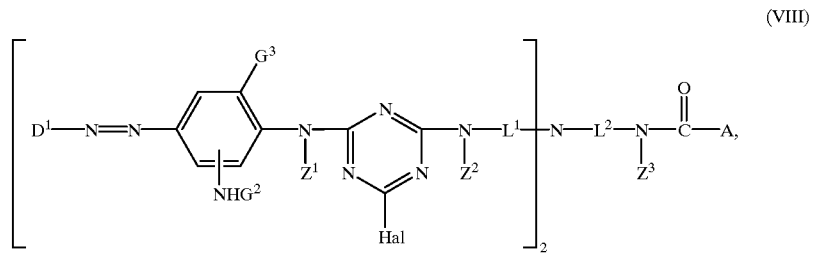

(VIII)

where
$D^1$, $Z^1$, $Z^2$, $Z^3$, Hal, $L^1$, $L^2$ and A are each as defined above,
$G^2$ is $C_1$–$C_4$-alkanoyl, carbamoyl, mono- or di-($C_1$–$C_4$)-alkylcarbamoyl, phenylcarbamoyl or cyclohexylcarbamoyl, and
$G^3$ is hydrogen, $C_1$–$C_4$-alkyl, $C_1$–$C_4$-alkoxy, hydroxysulfonyl or chlorine.

Particular preference is further given to reactive dyes of the formula IX

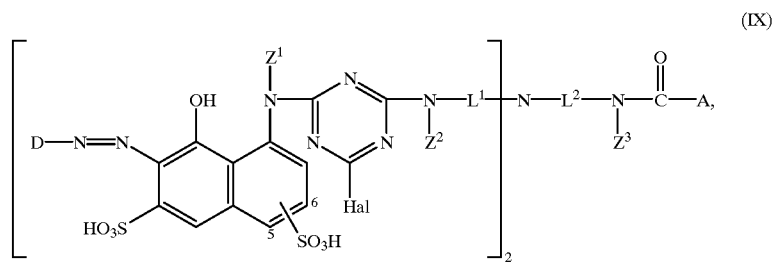

(IX)

where D, $Z^1$, $Z^2$, $Z^3$, Hal, $L^1$, $L^2$ and A are each as defined above and the hydroxysulfonyl group is disposed in ring position 5 or 6.

Particular preference is further given to reactive dyes of the formula X

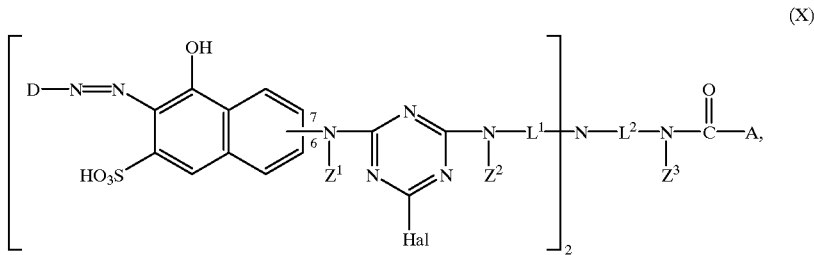
(X)

where D, $Z^1$, $Z^2$, $Z^3$, Hal, $L^1$, $L^2$ and A are each as defined above and the iminotriazine group is disposed in ring position 6 or 7.

Useful compounds further include those of the formula XI

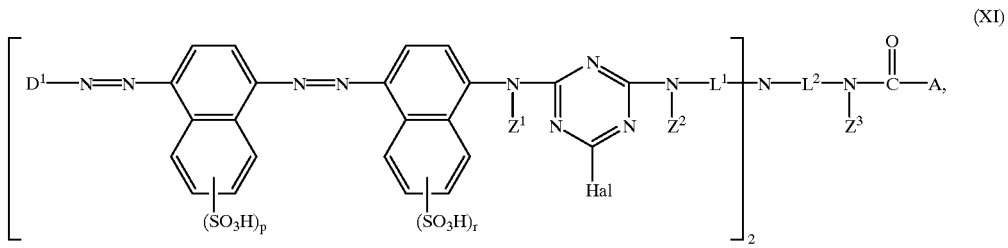
(XI)

where $D^1$, $Z^1$, $Z^2$, $Z^3$, Hal, $L^1$, $L^2$ and A are each as defined above and p and r are each independently of the other 0, 1 or 2.

Useful compounds further include those of the formula XII

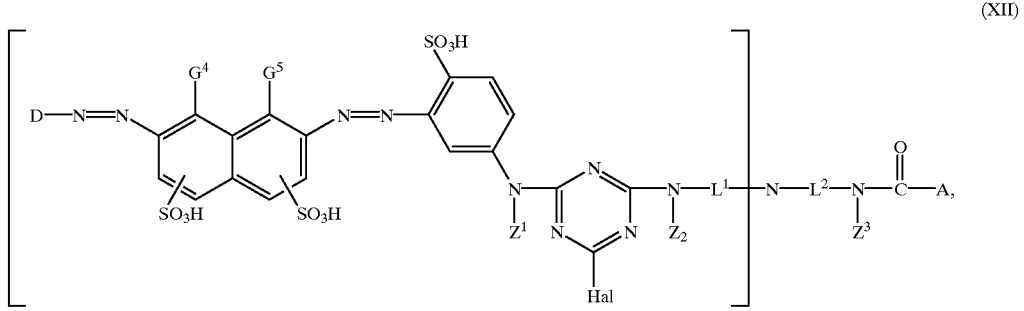
(XII)

where D, $Z^1$, $Z^2$, $Z^3$, Hal, $L^1$, $L^2$ and A are each as defined above and one of $G^4$ and $G^5$ is amino and the other is hydroxyl.

Instead of the azo dye radicals, the dyes of the formula I may also contain corresponding metal complex azo dye radicals. Contemplated complexing metals include in particular copper, cobalt, chromium, nickel or iron, of which copper, cobalt or chromium are preferred.

The metallized groups are preferably disposed in each case ortho to the azo group, for example in the form of o,o'-dihydroxy-, o-hydroxy-o'-carboxy-, o-carboxy-o'-amino- or o-hydroxy-o'-amino-azo groups.

Chr in the formula I is also for example the radical of a metallized formazan dye, in which case copper formazans should be mentioned in particular. Copper formazans are known per se and described for example in K. Venkataraman, The Chemistry of Synthetic Dyes, Vol. III, Academic Press, New York, London, 1970.

Particular preference is given to copper formazan dyes of the formula XIII

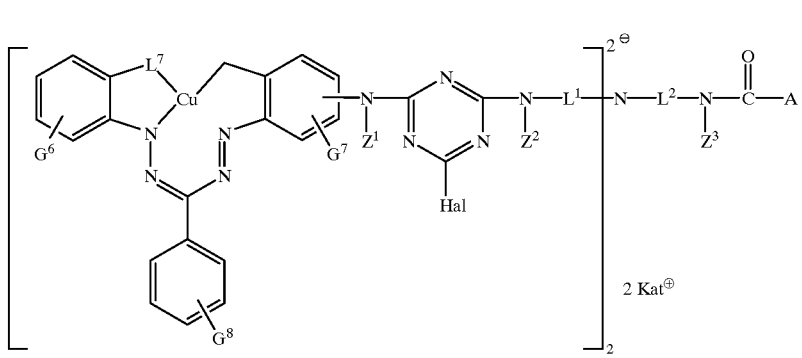

(XIII)

where one of the radicals $L^7$ and $L^8$ is oxygen and the other is carboxyl,

Kat$^\oplus$ is the equivalent of a cation, $G^6$, $G^7$ and $G^8$ are independently of the other hydrogen or hydroxysulfonyl, and $Z^1$, $Z^2$, $Z^3$, Hal, $L^1$, $L^2$ and A are each as defined above.

Kat$^\oplus$ in the formula XIII is the equivalent of a cation. It is either a proton or derived from metal or ammonium ions. Metal ions are in particular the lithium, sodium or potassium ions. Ammonium ions for the purposes of this invention are the abovementioned substituted or unsubstituted ammonium cations.

Preferred cations are protons or lithium, sodium or potassium ions, the metal cations mentioned also being preferred cations when the reactive dyes XIII are present in salt form.

One method of preparing the formazans underlying these dyes is described in EP-A-315 046 for example.

Chr in the formula I may also be for example the radical of an anthraquinone dye. Anthraquinones are known per se and described for example in K. Venkataraman, The Chemistry of Synthetic Dyes, Vol. II, Academic Press, New York, 1952.

Particular preference is given to anthraquinone dyes of the formula XIV where $Z^1$, $Z^2$, $Z^3$, Hal, $L^1$, $L^2$ and A are each as defined above, x is 0 or 1

$F^3$ and $F^4$ are independently of each other hydrogen or methyl and one of the two radicals $F^5$ and $F^6$ is hydrogen or methyl and the other is hydroxysulfonyl.

Chr in the formula I may also be for example the radical of a triphendioxazine dye. Triphendioxazines are known per se and described for example in EP-A-141 359 or EP-A-311 969.

Particular preference is given to triphendioxazine dyes of the formula XV

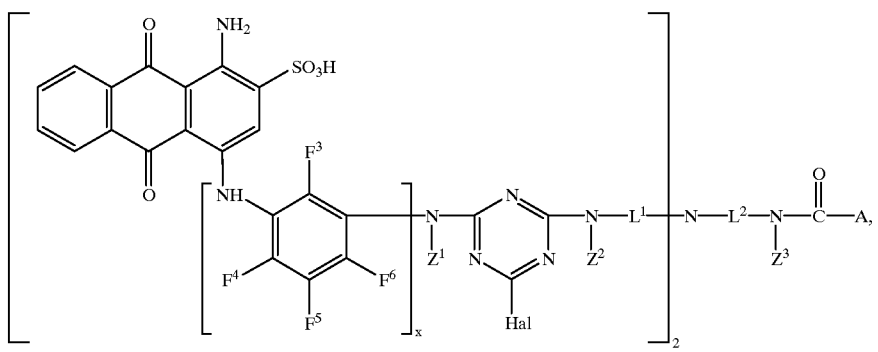

(XIV)

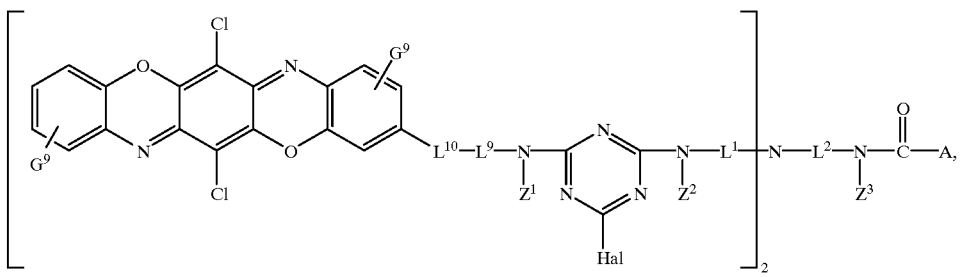

where
- $Z^1$, $Z^2$, $Z^3$, Hal, $L^1$, $L^2$ and A are each as defined above,
- $G^9$ is hydroxysulfonyl or the radical $SO_2$—$C_2H_4$—$SO_3H$,
- $L^9$ is $C_2$–$C_4$-alkylene or phenylene, and
- $L^{10}$ is oxygen, imino or $C_1$–$C_4$-alkylimino.

Chr in the formula I may also be for example the radical of a metallized phthalocyanine dye. Phthalocyanines are known per se and described for example in F. H. Moser, D. L. Thomas, The Phthalocyanines, Vol. II, CRC Press, Boca Raton, Fla. 1983.

Particular preference is given to the phthalocyanine dyes of the formula XVI

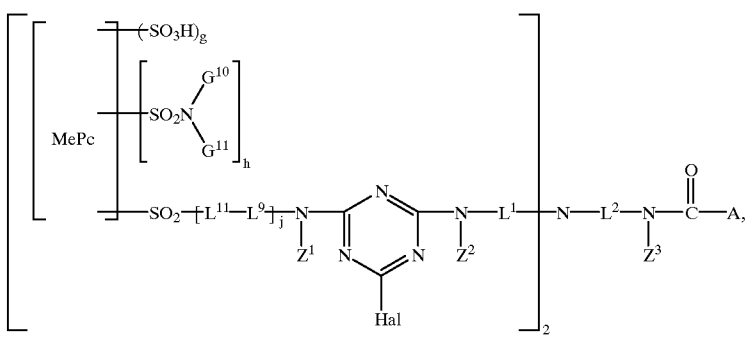

where
- Pc is the phthalocyanine radical,
- $G^{10}$ and $G^{11}$ are independently of each other hydrogen or $C_1$–$C_4$-alkyl,
- $L^{11}$ is imino or $C_1$–$C_4$-alkylimino,
- Me is copper or nickel,
- g is 0, 1 or 2,
- h is 0, 1 or 2
- j is 0, 1, 2 or 3
- and $Z^1$, $Z^2$, $Z^3$, Hal, $L^1$, $L^2$, $L^9$ and A are each as defined above.

Preference is given to doubled reactive dyes of the general formula I and especially of the formula VII–XVI, where $Z^1$ and $Z^2$ are each hydrogen.

Preference is further given to doubled reactive dyes of the formulae I and especially VII–XVI where $L^1$ and $L^2$ are identical.

Preference is further given to doubled reactive dyes of the formulae I and especially VII–XVI where A is methyl, ethyl or $C_1$–$C_6$-alkoxy, especially methyl, ethyl, methoxy or ethoxy.

Particular preference is additionally given to compounds of the formula I and to compounds of the preferred formulae VII–XVI where the substituents are selected from a combination of the above-recited preferred substituents.

The present invention further provides mixtures of the doubled reactive dyes of the general formula I with reactive dyes of the general formula XVII

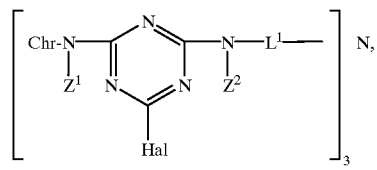

where
Chr, $Z^1$, $Z^2$, $L^1$ and Hal are each as defined above. These mixtures, based on 1 part by weight of the doubled reactive dye I, comprise from 10 to 100 parts by weight of the tripled reactive dye XVII.

The dyes of the formula I can bear other chromophores and also other radicals $Z^1$, $Z^2$, $L^1$ and Hal than the dyes of the formula XVII. However, preference is given to mixtures where the substituents have the same meanings.

The mixtures of the present invention may further comprise from 0.1 to 30 parts by weight of one or more red, orange, yellow or blue dyes, based on 1 part by weight of doubled reactive dye I.

Suitable yellow reactive dyes are described in U.S. Pat. No. 5,182,371, for example. The following dyes are also suitable: C.I. Reactive Yellow 145, C.I. Reactive Yellow 168 or C.I. Reactive Yellow 176.

Suitable orange reactive dyes conform for example to the formulae

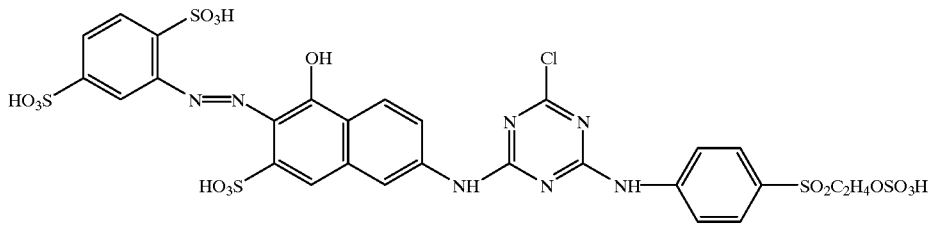

or

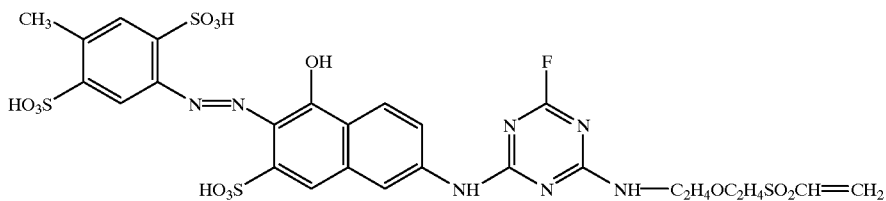

The following dyes are also suitable: C.I. Reactive Orange 7 (17 756), C.I. Reactive Orange 15, C.I. Reactive Orange 16 (17 757), C.I. Reactive Orange 56, C.I. Reactive Orange 57, C.I. Reactive Orange 72 (17 754), C.I. Reactive Orange 74, C.I. Reactive Orange 82, C.I. Reactive Orange 83 or C.I. Reactive Orange 90.

Suitable red reactive dyes are described in U.S. Pat. No. 5,200,511, for example. The following dyes are also suitable: C.I. Reactive Red 35, C.I. Reactive Red 103, C.I. Reactive Red 113, C.I. Reactive Red 180, C.I. Reactive Red 194, C.I. Reactive Red 195, C.I. Reactive Red 198, C.I. Reactive Red 222, C.I. Reactive Red 223, C.I. Reactive Red 227, C.I. Reactive Red 228 or C.I. Reactive Red 239.

Suitable dyes conform in particular to the formula XVIII $$[D^3-N=N-K^1-]_v Z \quad (XVIII),$$

where v is 1 or 2, $K^1$ is a radical of the formula

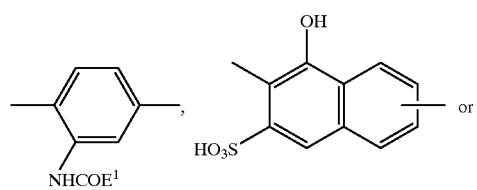

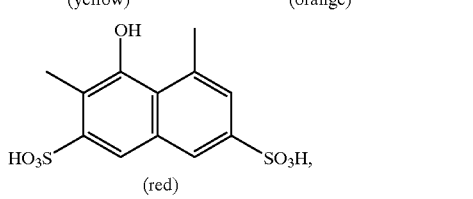

where, in each case, the bond line on the left hand side represents the bond with the azo linkage, $E^1$ is $C_1$–$C_4$-alkyl with or without hydroxyl substitution, phenyl, amino, or a radical of the formula $$NH-L^{12}-SO_2-C_2H_4-Q,$$

$D^3$ is a benzene or naphthalene radical which, in either case, may have a reactive group and may be substituted from one to three times by $C_1$–$C_4$-alkyl, $C_1$–$C_4$-alkoxy, hydroxyl or hydroxysulfonyl, and Z is $C_1$–$C_4$-alkanoylamino with or without carboxyl substitution, benzoylamino or a radical of the formula

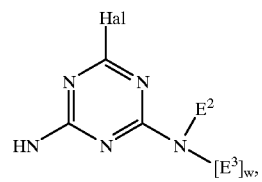

where w is 0 or 1,

Hal is fluorine or chlorine, $E^2$ is hydrogen or $C_1$–$C_4$-alkyl with or without interruption by an oxygen atom in ether function and with or without hydroxyl substitution, and $E^3$ is hydroxysulfonyl-monosubstituted or -disubstituted phenyl or a radical of the formula

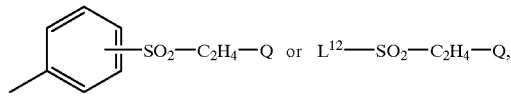

where Q is in each case as defined above and $L^{12}$ is in each case $C_2$–$C_4$-alkylene with or without interruption by 1 oxygen atom in ether function.

Suitable blue reactive dyes are for example C.I. Reactive Blue 171, C.I. Reactive Blue 160, C.I. Reactive Blue 191, C.I. Reactive Blue 198, C.I. Reactive Blue 211, C.I. Reactive Blue 71 or Reactive Black 5.

The individual dyes of the novel dye mixtures are known and available by preparative methods known to one skilled in the art. Some, for example Reactive Black 5, are available commercially. The novel dye mixtures are available by mechanical mixing of the individual components.

The dyes of the invention are obtainable by reacting about 2 mol eqivalents of a compound of the general formula XIX

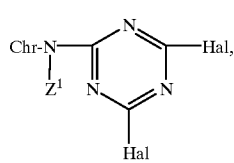

XIX with one mole equivalent of a polyamine of the formula XX

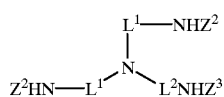

XX and subsequent acylation or conversion into the carbonic esters or amides.

The acylation is advantageously effected by means of anhydrides or acyl chlorides. Examples of suitable parent carboxylic acids for the anhydrides or acyl chloride are formic acid, acetic acid, chloropropionic acid, chloroacetic acid, nitrobenzoic acid, maleic acid or succinic acid.

Preferred carbonic acid derivatives are methyl chlorocarbonate, ethyl chlorocarbonate or phenyl chlorocarbonate.

The reaction of halotriazine with amines is common general knowledge and is generally carried out at pH 5–8 and from 10 to 50° C.

The subsequent acylation or conversion into the carbonic esters or amides is generally effected at pH 5–8 in the presence of alkali metal hydroxides such as sodium hydroxide or potassium hydroxide or alkali metal carbonates. This reaction is typically carried out at 10–50° C., too. In general, the reaction ends after 2–3 hours.

The dyes of the invention are provided by the described process in a purity which obviates additional purifying steps such as filtration or salting out and permits direct spray drying.

Altering the stoichiometric ratio of XIX to XX to a 3:1 ratio increases the proportion of the tripled reactive dye XVII. Whereas a 1:1 stoichiometry will merely produce the trimer as a by-product, not less than 2:1 mol equivalents of compound XIX, based on 1 mol equivalent of polyamine, are necessary to arrive at the mixtures of the invention.

The novel reactive dyes of the formula I and their mixtures according to the invention are advantageously useful for dyeing or printing hydroxyl-containing or nitrogenous organic substrates. Such substrates are for example leather or fiber material predominantly comprising natural or synthetic polyamides or natural or regenerated cellulose. The dyes and their mixtures are also useful for printing paper and textiles with inkjet inks. In inkjet inks, the dye is present in the aqueous solution with or without water-soluble organic solvents in the mixture. The dyes of the invention are also useful for dyeing keratinous fibers, e.g., in hair dyeing or the dyeing of furs. The novel dyes are preferably useful for dyeing and printing textile material based on wool or especially cotton.

Substrates based on cellulose, in particular, are dyed with very high yield of fixation in strong shades having very good lightfastness and also excellent wetfastnesses, such as wash, chlorine bleach, peroxide bleach, alkali, sea water or perspiration fastness.

The Examples which follow illustrate the invention.

EXAMPLE 1 a) 62 g of 1-hydroxy-2-(1-sulfonaphthyl-2-azo)-8-aminonaphthalene-3,6-disulfonic acid were dissolved in 250 ml of water. 11.6 g of cyanuric chloride were added at 5–7° C. and the pH was maintained at 6 with 10% strength by weight lithium hydroxide solution (consumption: 55 g). 5.84 g of trisaminoethylamine were then added, the pH was maintained at 8.5 with lithium hydroxide, and the temperature was raised to 60° C. over 30 minutes. After 4 hours, the batch was cooled down to 20–25° C., adjusted to pH 6.5 with dilute hydrochloric acid and admixed with 200 g of acetone. Suction filtration and drying at 40° C. isolated 53 g of the compound

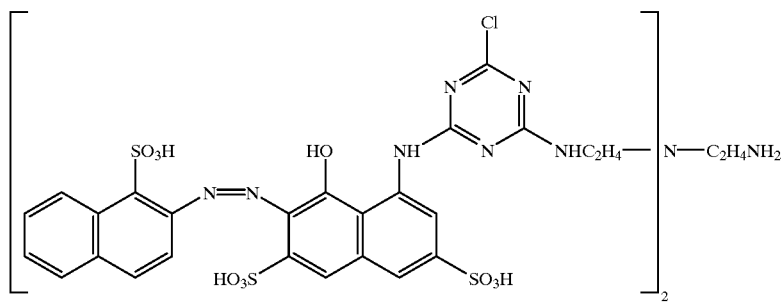

$\lambda_{max}$ (in water): 516 nm, shoulder at 548 nm.

b) 11.6 g of the compound prepared under a) were dissolved in 250 ml of water. 6 g of succinic anhydride were added at pH 6.5 and 20–25° C. over 2 hours. After a further 4 hours, roughly half of the water was distilled off under reduced pressure. The crystal slurry was stirred up with 200 g of i-propanol and filtered off with suction to leave, after drying, 13 g of the compound of the formula

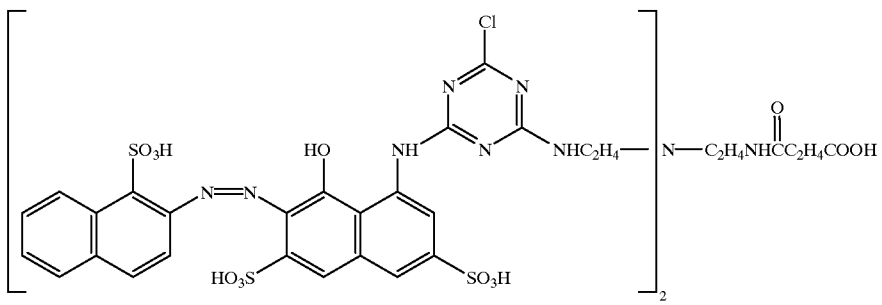

λ_max (in water): 514 nm, shoulder 548 nm.
The ESI mass spectrum peaks at mass 1574.

EXAMPLE 2

Example 1 was repeated, except that 6 g of acetic anhydride were added under b) instead of malonic anhydride.

This yielded, after drying, 12 g of the compound of the formula

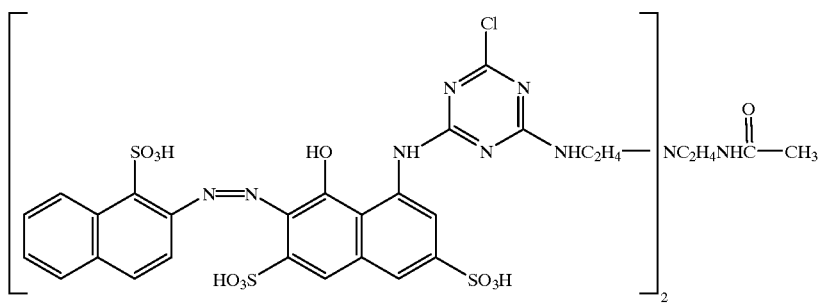

λ_max (in water): 516 nm, shoulder 546 nm.

EXAMPLE 3

Example 1 was repeated, except that 5.6 g of 3-nitrobenzoyl chloride dissolved in 15 g of acetone were added under b) instead of malonic anhydride. The pH was maintained at 5.0 with 5% strength by weight lithium hydroxide solution.

This yielded, after drying, 12 g of the compound of the formula

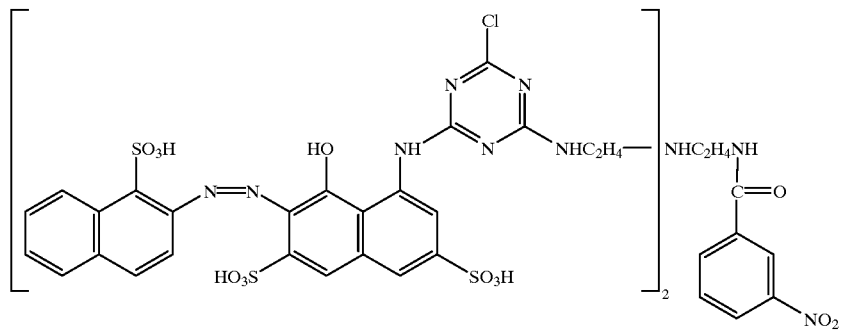

λ_max (in water): 518 nm, shoulder 548 nm.

EXAMPLE 4

Example 1 was repeated, except that 6.3 g of phenyl chloroformate were used under b) instead of malonic anhydride. This yielded, after drying, 10 g of the compound.

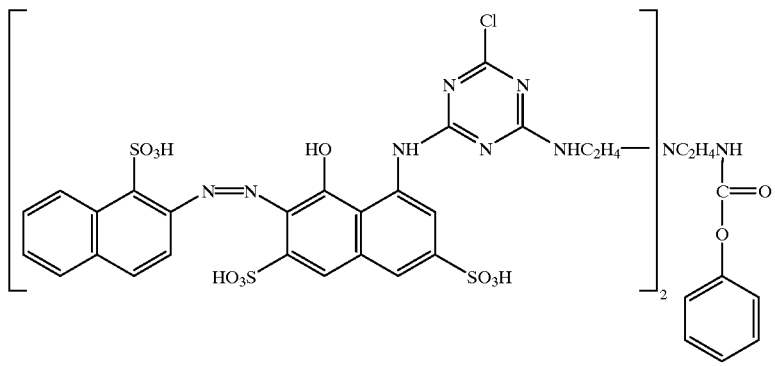

$\lambda_{max}$ (in water): 518 nm, shoulder 548 nm.

EXAMPLE 5

Example 1 was repeated, except that only 2.7 g of trisaminoethylamine were added. After the reaction had ended and the pH had been adjusted to 6.5, 5 g of acetic anhydride were added dropwise at 40° C. The batch was allowed to cool down to room temperature after 2 hours and then ultrafiltered and spray dried. According to HPLC analysis, it comprises 0.8% of the dye of Example 1a), 9% of the dye of Example 2 and 90% of the dye of the formula

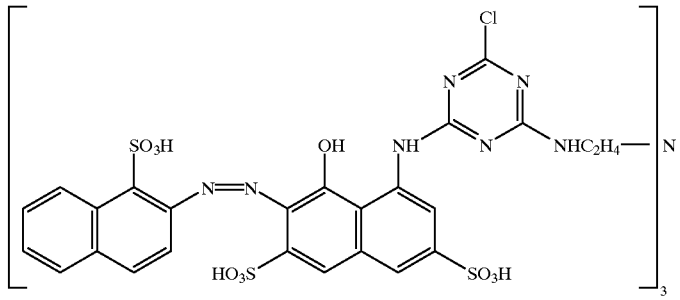

I claim:
1. Doubled reactive dyes of the general formula I

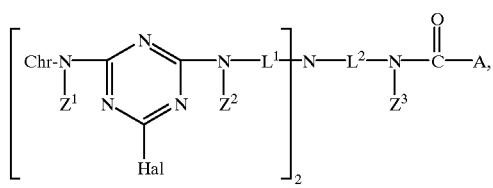

where

Chr is a chromophore residue with or without further fiber-reactive groups and derived from a metallized or unmetallized mono- or disazo dye, from a triphendioxazine, from an anthraquinone, from a mettalized formazan or from a mettallized phthalocyanine, $Z^1$, $Z^2$ and $Z^3$ are each independently of the otehrs hydrogen or substituted or unsubstituted $C^1$–$C^6$-alkyl, Hal is fluorine or chlorine, $L^1$ and $L^2$ are each independently of the other $C^2$–$C^6$-alkylene with or without interruption by 1 or 2 unadjacent oxygen atoms, and A is hydrogen, substituted or unsubstituted $C^1$–$C^6$-alkyl, substituted or unsubstituted phenyl, substituted or unsubstituted $C^1$–$C^6$-alkoxy, substituted or unsubstituted phenoxy or $C^1$–$C^6$-alkylamino.

2. Doubled reactive dyes as claimed in claim 1, wherein $Z^1$ and $Z^2$ are each hydrogen.

3. Doubled reactive dyes as claimed in claim 1 or 2, wherein $L^1$ and $L^2$ are identical.

4. Doubled reactive dyes as claimed in claim 1, wherein A is methyl, ethyl or $C_1$–$C_6$-alkoxy.

5. Doubled reactive dyes as claimed in claim 1, wherein A is methyl, ethyl, methoxy or ethoxy.

6. Mixtures comprising 1 part by weight of doubled reactive dyes of the general formula I as claimed in claim 1 and from 10 to 100 parts by weight of dye of the general formula XVII

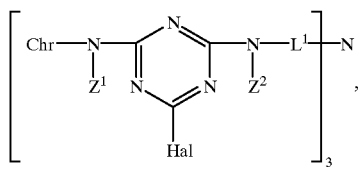

where

Chr, $Z^1$, $Z^2$, Hal and $L^1$ are each as defined in claim 1.

7. Mixtures as claimed in claim 6, wherein Chr, $Z^1$, $Z^2$, Hal and $L^1$ are identical in the formula I and in the formula XVII.

8. Mixtures as claimed in claim 6, further comprising from 0.1 to 30 parts by weight of a red, orange, yellow or blue dye, based on 1 part by weight of doubled reactive dyes I.

9. A process for preparing mixtures as claimed in claim 6, which comprises reacting from 2 to 3 mol equivalents of a compound of the formula XIX

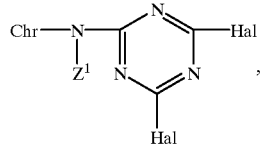
(XIX)

with one mole equivalent of a polyamine of the formula XX

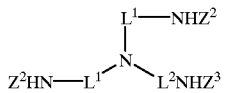
XX and subsequently acylating the $NHZ^3$ groups still present in the reaction mixture or converting them into carbonic esters or amides.

10. A method of dyeing or printing on a substrate, comprising applying the reactive dyes of claim 1 to substrate.

11. The method of claim 10, wherein the substrate is a hydroxyl-containing or a nitrogenous substrate.

* * * * *